United States Patent
Liang et al.

(10) Patent No.: US 8,461,765 B2
(45) Date of Patent: Jun. 11, 2013

(54) LED DRIVING DEVICE

(75) Inventors: Tsorng-Juu Liang, Tainan (TW);
Wei-Ching Tseng, Tainan (TW);
Jiann-Fuh Chen, Tainan (TW)

(73) Assignee: National Cheng Kung University, Tainan (TW)

( * ) Notice: Subject to any disclaimer, the term of this patent is extended or adjusted under 35 U.S.C. 154(b) by 286 days.

(21) Appl. No.: 13/110,204

(22) Filed: May 18, 2011

(65) Prior Publication Data

US 2011/0273099 A1 Nov. 10, 2011

(30) Foreign Application Priority Data

May 19, 2010 (TW) ................................ 99115944 A

(51) Int. Cl.
*H05B 37/00* (2006.01)
(52) U.S. Cl.
USPC .................... 315/185 R; 315/186; 315/200 R; 315/201
(58) Field of Classification Search
USPC ............................ 315/185 R, 186, 200 R, 201
See application file for complete search history.

(56) References Cited

U.S. PATENT DOCUMENTS

| | | | |
|---|---|---|---|
| 2010/0295460 A1* | 11/2010 | Lin et al. | 315/193 |
| 2011/0101876 A1* | 5/2011 | Jheng et al. | 315/201 |
| 2012/0206056 A1* | 8/2012 | Jung et al. | 315/200 R |

* cited by examiner

*Primary Examiner* — Jason M Crawford
(74) *Attorney, Agent, or Firm* — Bacon & Thomas, PLLC

(57) ABSTRACT

An LED driving device includes a rectifier circuit, a first LED module, a first switch, a second LED module, a second switch, and a diode module. The rectifier circuit includes a pair of input terminals and first and second output terminals for receiving an AC voltage and rectifying the AC voltage to output a pulsed rectified voltage. The first LED module and first switch connected in series are electrically connected between the first and second output terminals of the rectifier circuit. The second LED module and second switch connected in series are electrically connected between the first and second output terminals of the rectifier circuit. The diode module is connected between a common node of the first LED module and the first switch and a common node of the second LED module and the second switch.

13 Claims, 8 Drawing Sheets

US 8,461,765 B2

LED DRIVING DEVICE

CROSS REFERENCE TO RELATED APPLICATION

This application claims the benefits of the Taiwan Patent Application Serial Number 099115944, filed on May 19, 2010, the subject matter of which is incorporated herein by reference.

BACKGROUND OF THE INVENTION

1. Field of the Invention

The present invention relates to a driving device and, more particularly, to light emitting diode (LED) driving device.

2. Description of Related Art

Alternating current LED (AC-LED) module can be directly driven by utility power for thus providing the advantage of simple architecture, as shown in FIG. 1. However, it suffers a disadvantage in that, when the received AC voltage $v_{ac}$ is being increased, the current $i_{ac}$ flowing through AC-LED module is getting large, resulting in a droop effect that may lower the luminous efficiency. Furthermore, because the AC-LED module is sensitive to the variation of voltage, a slight change of AC voltage $v_{ac}$ will cause a large variation in the light output. Thus, when the AC voltage is unstable, it is likely to have a flicking effect. In addition, in order to bear the peak value of the AC voltage, the AC-LED is typically made to have a high turn-on voltage by, for example, connecting several LEDs in series, which results in a low power factor and low LED efficiency.

In the known patents, U.S. Pat. No. 6,989,807 granted to Chiang discloses an "LED driving device" that receives utility power and has high power factor and high LED efficiency. As shown in FIG. 2, this LED driving device includes a bridge rectifier circuit 30, a current switching circuit 10, a plurality of LEDs and a voltage detecting circuit 20. The bridge rectifier circuit 30 receives the AC voltage of an external power supply and converts the same into a rectified voltage. The voltage detecting circuit 20 controls the current switching circuit 10 to change the number of LEDs that are turned on according to the variation of the rectified voltage, so as to improved the power factor and the LED efficiency. However, such a constant current control architecture is complicated and the control there of is difficult, resulting in that the number of devices used in the overall circuit is excessive and thus the volume becomes large and the manufacturing cost is increased.

Therefore, it is desirable to provide an improved LED driving device to mitigate and/or obviate the aforementioned problems.

SUMMARY OF THE INVENTION

The object of the present invention is to provide an LED driving device capable of increasing the LED efficiency while avoiding complicated control architecture.

To achieve the object, the LED driving device of the present invention includes: a rectifier circuit including a pair of input terminals and first and second output terminals, for receiving an AC voltage from the pair of input terminals and rectifying the AC voltage so as to output a pulsed rectified voltage at the first and second output terminals; a first LED module and a first switch connected in series, which are electrically connected between the first and second output terminals of the rectifier circuit, wherein the first switch is controllable to switch between on and off states; a second LED module and a second switch connected in series, which are electrically connected between the first and second output terminals of the rectifier circuit, wherein the second switch is controllable to switch between on and off states; and a diode module connected between a common node of the first LED module and the first switch and a common node of the second LED module and the second switch.

Other objects, advantages, and novel features of the invention will become more apparent from the following detailed description when taken in conjunction with the accompanying drawings.

DETAILED DESCRIPTION OF THE PREFERRED EMBODIMENT

Reference will now be made in detail to present three embodiments of the present invention, examples of which are illustrated in the accompanying drawings. Wherever possible, the same reference numbers will be used throughout the drawings to refer to the same or like parts.

Figure 1:
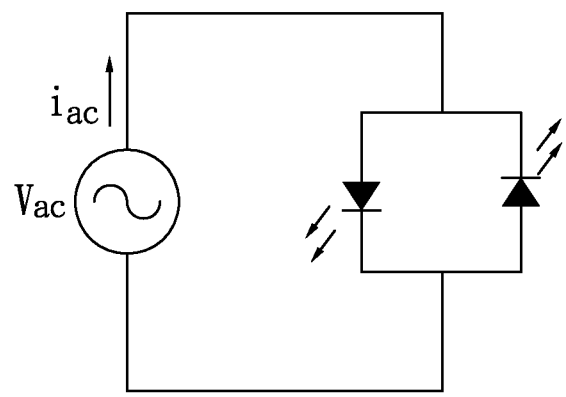
FIG. 1 is a schematic diagram of a typical AC-LED module.
Figure 2:
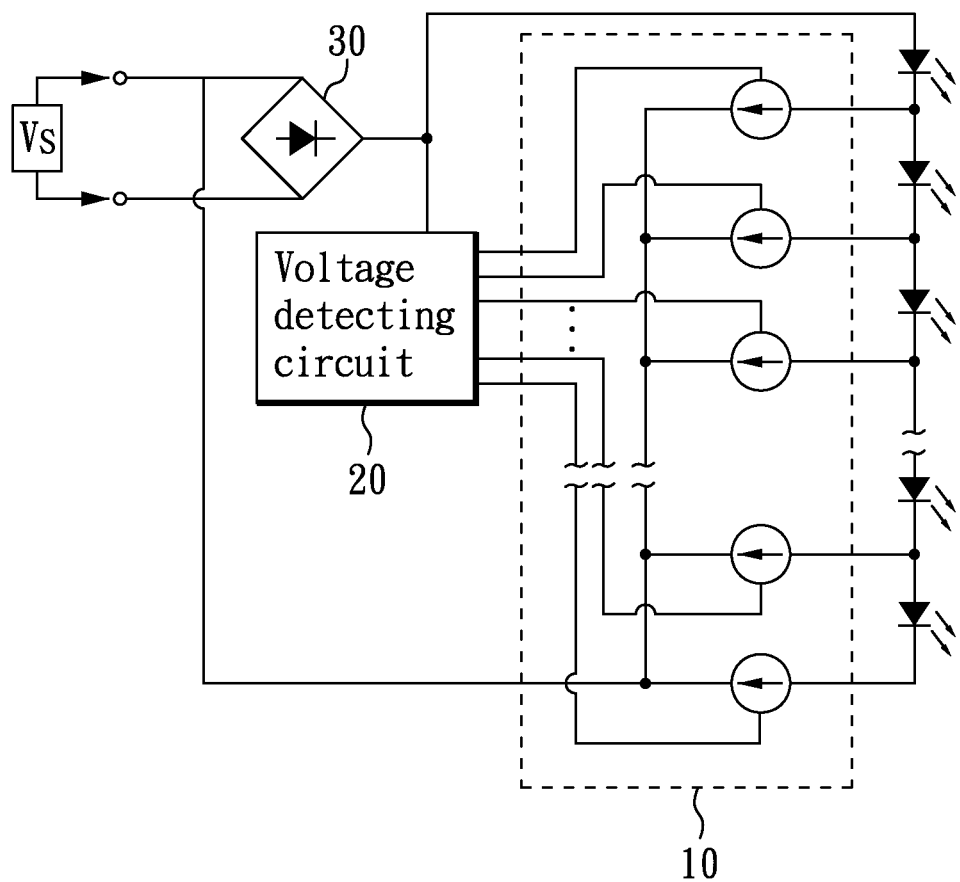
FIG. 2 is a schematic diagram of a prior LED driving device.
Figure 3:
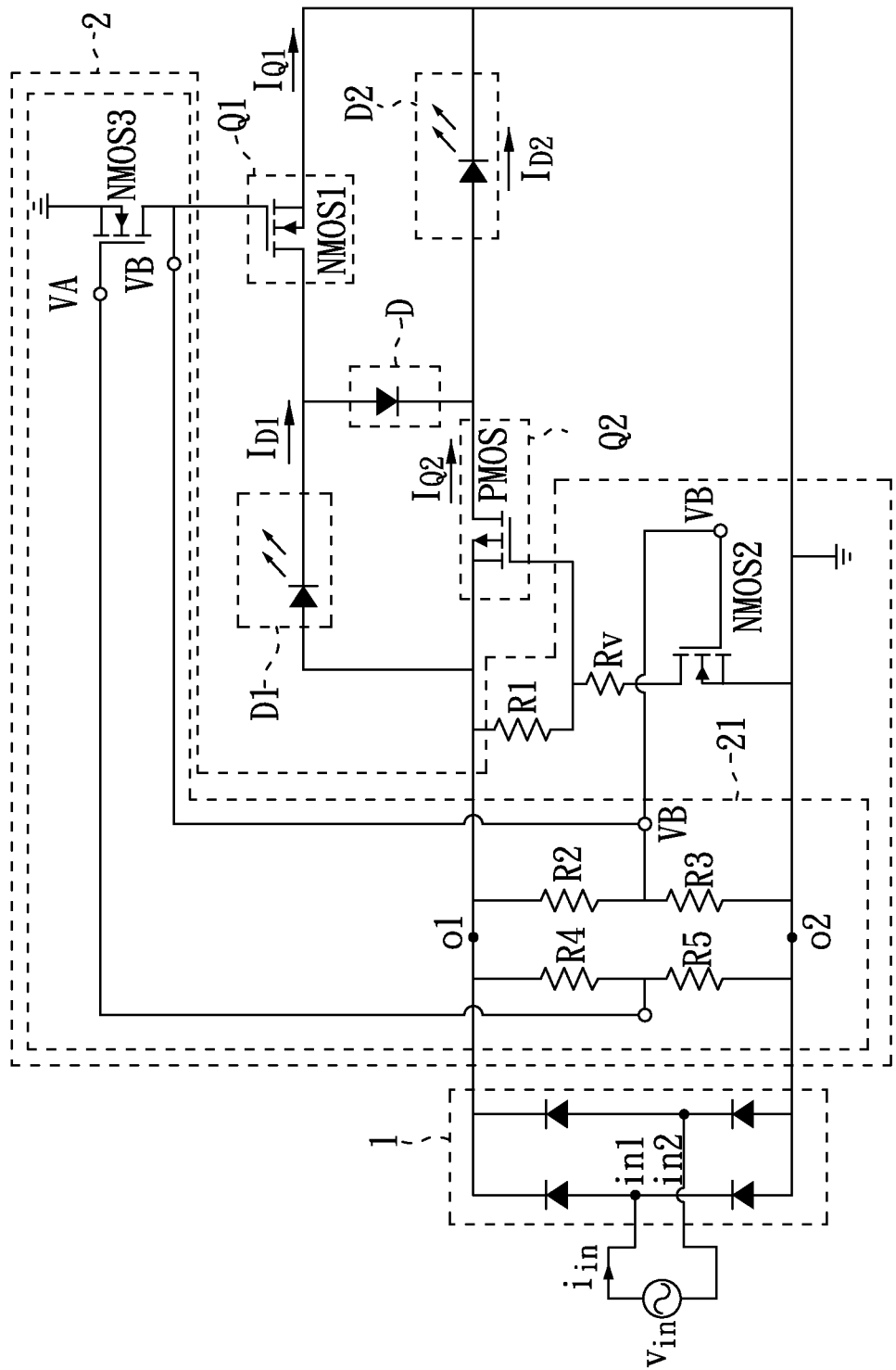
FIG. 3 is a circuit diagram of the LED driving device in accordance with a first embodiment of the present invention.

With reference to FIG. 3, there is shown an LED driving device in accordance with a first embodiment of the present invention, which includes: a rectifier circuit 1, a first LED module D1, a first switch Q1, a second LED module D2, a second switch Q2, a diode module D and a control circuit 2.

The rectifier circuit 1 includes a pair of input terminals in1, in2, and first and second output terminals o1, o2. The rectifier circuit 1 is suitable for receiving an AC voltage $v_{in}$ from the pair of input terminals and rectifying the AC voltage $v_{in}$, so as to output a pulsed rectified voltage at the first and second output terminals o1, o2.

The serially connected first LED module D1 and first switch Q1 are electrically connected between the first and second output terminals o1, o1 of the rectifier circuit 1. The first switch Q1 is controllable to switch between on and off states.

In this embodiment, the first LED module D1 has a first terminal electrically connected to the first output terminal o1 of the rectifier circuit 1, and a second terminal, and is able to establish a current path from the first terminal to the second terminal. The first switch Q1 includes a first N-type metal oxide semiconductor field effect transistor NMOS1. The transistor NMOS1 has a drain electrically connected to the second terminal of the first LED module D1, a source electrically connected to the second output terminal o2 of the rectifier circuit 1, and a gate electrically connected to the control circuit 2.

The serially connected second LED module D2 and second switch Q2 are electrically connected between the first and second output terminals o1, o1 of the rectifier circuit 1. The second switch Q2 is controllable to switch between on and off states.

The second LED module D2 has a first terminal and a second terminal electrically connected to the second output terminal o2 of the rectifier circuit 2, and is able to establish a current path from the first terminal to the second terminal. The second switch Q2 includes a P-type metal oxide semiconductor field effect transistor PMOS. The transistor PMOS has a drain electrically connected to the first terminal of the second LED module D2, a source electrically connected to the first output terminal o1 of the rectifier circuit 1, and a gate electrically connected to the control circuit 2.

The diode module D is connected between the common node of the first LED module D1 and the first switch Q1 and the common node of the second LED module D2 and the second switch Q2.

In this embodiment, the diode module D has a first terminal electrically connected to the common node of the first LED module D1 and the first switch Q1, and a second terminal electrically connected to the common node of the second LED module D2 and the second switch Q2, and is able to establish a current path from the first terminal to the second terminal.

The control circuit 2 is electrically connected between the first and second output terminals o1, o2 of the rectifier circuit 1 and the two switches Q1, Q2 for controlling whether to turn on the first and second switches or not according to the rectified voltage.

In this embodiment, the control circuit 2 includes a first resistor R1, a second N-type metal oxide semiconductor field effect transistor NMOS2 and a control unit 21.

The first resistor R1 is electrically connected between the first output terminal o1 of the rectifier circuit 1 and the gate of the P-type metal oxide semiconductor field effect transistor PMOS.

The second N-type metal oxide semiconductor field effect transistor NMOS2 has a drain electrically connected to the gate of the P-type metal oxide semiconductor field effect transistor PMOS, a source electrically connected to the second output terminal o2 of the rectifier circuit 1, and a gate. Preferably, there may be an optional voltage-dividing resistor Rv provided so that the drain of the second N-type metal oxide semiconductor field effect transistor NMOS2 is connected to the gate of the P-type metal oxide semiconductor field effect transistor PMOS and the resistor R1 via this voltage-dividing resistor Rv for protecting the P-type metal oxide semiconductor field effect transistor PMOS from over-voltage when the second N-type metal oxide semiconductor field effect transistor NMOS2 is turned on.

The control unit 21 is electrically connected between the first and second output terminals o1, 02 of the rectifier circuit 1 and the gates of the first and second N-type metal oxide semiconductor field effect transistors NMOS1, NMOS2 for controlling whether to turn on the first and second N-type metal oxide semiconductor field effect transistors NMOS1, NMOS2 or not according to the rectified voltage. When the second N-type metal oxide semiconductor field effect transistor NMOS2 is turned on, the voltage across on the first resistor R1 is large enough to turn on the P-type metal oxide semiconductor field effect transistor PMOS. When the second N-type metal oxide semiconductor field effect transistor NMOS2 is turned off, the voltage across on the first resistor R1 is not large enough to turn on the P-type metal oxide semiconductor field effect transistor PMOS.

The control unit 21 has a second resistor R2, a third resistor R3, a fourth resistor R4, a fifth resistor R5, and a third N-type metal oxide semiconductor field effect transistor NMOS3.

The serially connected second and third resistors R2, R3 are electrically connected between the first and second output terminals o1, o2 of the rectifier circuit 1. The common node of the second and third resistors R2, R3 is electrically connected to the gates of the first and second N-type metal oxide semiconductor field effect transistors NMOS1, NMOS2, and a first voltage VB is provided at this common node.

The serially connected fourth and fifth resistors R4, R5 are electrically connected between the first and second output terminals o1, o2 of the rectifier circuit 1, and a second voltage VA is provided at the common node of the fourth and fifth resistors R4, R5.

The third N-type metal oxide semiconductor field effect transistor NMOS 3 has a drain electrically connected to the common node of the second and third resistors R2, R3, a source electrically connected to the ground, and a gate electrically connected to the common node of the fourth and fifth resistors R4, R5.

When the rectified voltage is between a first reference voltage and a second reference voltage, the control unit 21 turns on the first and second N-type metal oxide semiconductor field effect transistors NMOS1, NMOS2; otherwise, the control unit 21 turns off the first and second N-type metal oxide semiconductor field effect transistors NMOS1, NMOS2.

The first reference voltage is smaller than the second reference voltage. The first reference voltage is determined by the resistances of the second and third resistors R2, R3 and the threshold voltages of the first and second N-type metal oxide semiconductor field effect transistors NMOS1, NMOS2. The second reference voltage is determined by the resistances of the fourth and fifth resistors R4, R5 and the threshold voltage of the third N-type metal oxide semiconductor field effect transistor NMOS3.

Figure 4:
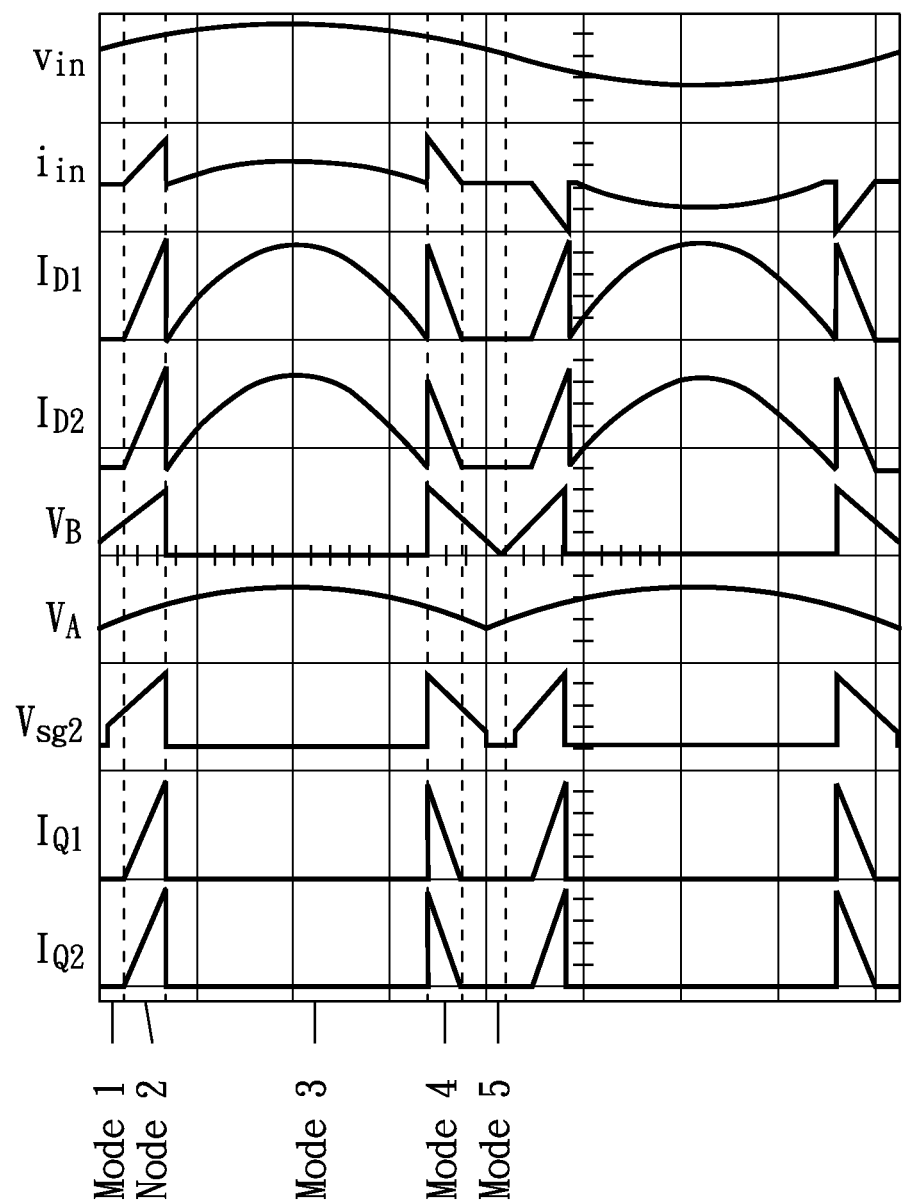
FIG. 4 is a timing diagram of the LED driving device in accordance with the first embodiment of the present invention.

As shown in FIG. 4, the parameters $I_{D1}$, $I_{D2}$, $I_{Q1}$, $I_{Q2}$ represent currents flowing through the first LED module D1, the second LED module D2, the transistor NMOS1 and the transistor PMOS, respectively; the parameters $V_B$, $V_A$, $V_{sg2}$ represent the first voltage (i.e., the control signal of the first and second switches Q1, Q2), the second voltage (i.e., the control signal of the third N-type metal oxide semiconductor field effect transistor) and the source-gate voltage of the PMOS, respectively. When the AC voltage $v_{in}$ is in the positive half cycle, a description is given for five operation modes in the following. Further, in this embodiment, the voltage of the first LED module D1 for starting to establish a current path is substantially the same as that of the second LED module D2 for starting to establish a current path.

When the AC voltage $v_{in}$ is zero, the transistors NMOS1-NMOS3, PMOS are all turned off, and thus there is no current flowing through the first and second LED modules D1, D2.

Mode 1:

When the AC voltage $v_{in}$ is gradually increased from zero and the rectified voltage is larger than the first reference voltage, the first voltage VB is increased to exceed the threshold voltages of the two transistors NMOS1, NMOS2, and thus the two transistors NMOS1, NMOS2 are turned on. Because the transistor NMOS2 is turned on, the source-gate voltage Vsg2 of the transistor PMOS is increased so that the transistor PMOS is also turned on and, at this time, the first and second LED modules D1, D2 are deemed to be connected in parallel between the first and second output terminals o1, o2 of the rectifier circuit 1. At this moment, the AC voltage $v_{in}$ does not reach the initial turn-on voltage (i.e., the voltage for starting to establish a current path) of the first and second LED modules D1, D2, and thus there is no current flowing through. When the AC voltage $v_{in}$ is gradually increased to turn on the first and second LED modules D1, D2, mode 2 is entered.

Mode 2:

The AC voltage $v_{in}$ is gradually increased to turn on and connect the first and second LED modules D1, D2 in parallel. With the increasing of the AC voltage $v_{in}$, the currents $I_{D1}$, $I_{D2}$ are also gradually increased.

When the AC voltage $v_{in}$ is increased to make the rectified voltage larger than the second reference voltage, the second voltage VA is large enough to turn on the transistor NMOS3, and mode 3 is entered.

Mode 3:

The AC voltage $v_{in}$ is gradually increased to make the second voltage VA large enough to turn on the transistor NMOS3, and the first voltage VB is pulled to ground level, so that the two transistors NMOS1, NMOS2 are turned off and the transistor PMOS is cut off. At this moment, the first and second LED modules D1, D2 are instantly transited from parallel-connection to be serially connected between the first and second output terminals o1, o2 of the rectifier circuit 1. Therefore, the voltage across on the first and second LED modules D1, D2 is decreased by half, and the currents $I_{D1}$, $I_{D2}$ are abruptly decreased and then are increased again as the AC voltage $v_{in}$ is gradually increased. When the AC voltage is decreased and the rectified voltage is smaller than the second reference voltage, the value of the second voltage VA is not large enough to turn on the transistor NMOS3, and mode 4 is entered.

Mode 4:

The transistor NMOS3 is turned off, and the two transistors NMOS1, NMOS2 and the transistor PMOS are turned on. The first and second LED modules D1, D2 are transited from series-connection to be connected in parallel between the two output terminals o1, o2 of the rectifier circuit 1. Therefore, the voltage across on the first and second LED modules D1, D2 is abruptly increased by two times, and the currents $I_{D1}$, $I_{D2}$ are abruptly increased and then are decreased as the AC voltage $v_{in}$ is gradually decreased. When the AC voltage is decreased and the rectified voltage is smaller than the first reference voltage, the first voltage VB is lower than the threshold voltages of the two transistors NMOS1, NMOS2, and mode 5 is entered.

Mode 5:

The two transistors NMOS1, NMOS2 and the transistor PMOS are turned off, and the AC voltage $v_{in}$ is not large enough to turn on the first and second LED modules D1, D2. When the AC voltage $v_{in}$ is decreased to zero, the operation of the positive half cycle comes to an end.

When the AC voltage $v_{in}$ is in the negative half cycle, the operation of the circuit is similar and thus a detailed description is deemed unnecessary.

Figure 5:
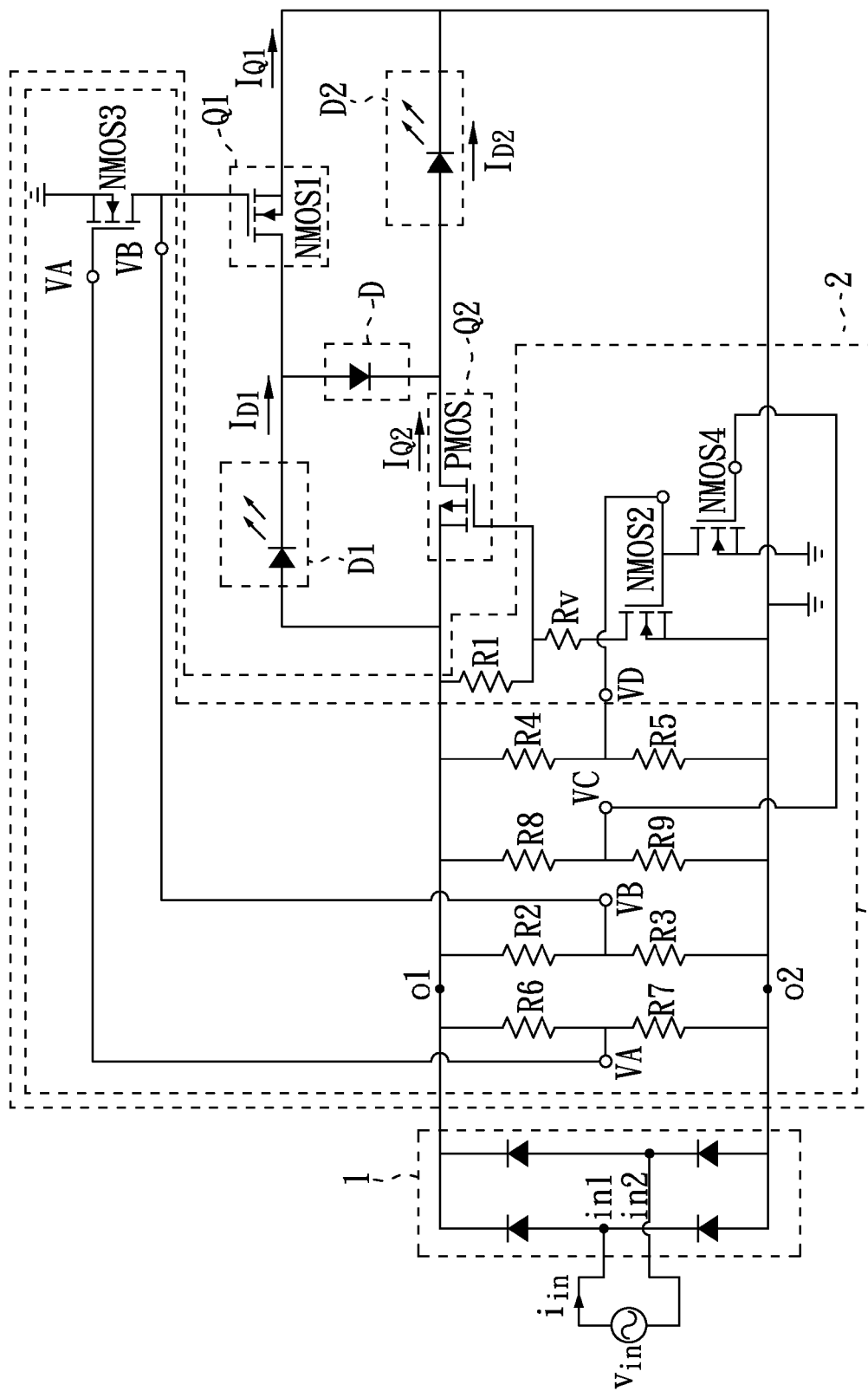
FIG. 5 is a circuit diagram of the LED driving device in accordance with a second embodiment of the present invention.

With reference to FIG. 5, there is shown an LED driving device in accordance with a second embodiment of the present invention, which is similar to that of the first embodiment except for the following.

The voltage of the first LED module D1 for starting to establish a current path is substantially smaller than that of the second LED module D2 for starting to establish a current path.

When the rectified voltage is between the first and second reference voltages, the control unit 2 turns on the first and second N-type metal oxide semiconductor field effect transistors NMOS1, NMOS2. When the rectified voltage is between the second reference voltage and a third reference voltage, the first N-type metal oxide semiconductor field effect transistor NMOS1 is turned off and the second N-type metal oxide semiconductor field effect transistor NMOS2 is turned on. Otherwise, the first and second N-type metal oxide semiconductor field effect transistors NMOS1, NMOS2 are turned off. The first reference voltage is smaller than the second reference voltage, and the second reference voltage is smaller than the third reference voltage.

Further, the control unit 21 includes: second to ninth resistors R2-R9, a third N-type metal oxide semiconductor field effect transistor NMOS3, a fourth N-type metal oxide semiconductor field effect transistor NMOS4.

The serially connected second and third resistors R2, R3 are electrically connected between the first and second output terminals o1, o2 of the rectifier circuit 1. The common node of the second and third resistors R2, R3 is electrically connected to the gate of the first N-type metal oxide semiconductor field effect transistor NMOS1, and a first voltage VB is outputted at this common node.

The serially connected fourth and fifth resistors R4, R5 are electrically connected between the first and second output terminals o1, o2 of the rectifier circuit 1. The common node of the fourth and fifth resistors R4, R5 is electrically connected to the gate of the second N-type metal oxide semiconductor field effect transistor NMOS2, and a third voltage VD is outputted at this common node.

The serially connected sixth and seventh resistors R6, R7 are electrically connected between the first and second output terminals o1, o2 of the rectifier circuit 1, and a second voltage VA is outputted at the common node of the sixth and seventh resistors R6, R7.

The serially connected eighth and ninth resistors R8, R9 are electrically connected between the first and second output terminals o1, o2 of the rectifier circuit 1, and a fourth voltage VC is outputted at the common node of the eighth and ninth resistors R8, R9.

The third N-type metal oxide semiconductor field effect transistor NMOS3 has a drain electrically connected to the common node of the second and third resistors R2, R3, a source electrically connected to the ground, and a gate electrically connected to the sixth and seventh resistors R6, R7.

The fourth N-type metal oxide semiconductor field effect transistor NMOS4 has a drain electrically connected to the common node of the fourth and fifth resistors R4, R5, a source electrically connected to the ground, and a gate electrically connected to the eighth and ninth resistors R8, R9.

The first reference voltage is determined by the resistances of the second, third, fourth and fifth resistors R2-R5 and the threshold voltages of the first and second N-type metal oxide semiconductor field effect transistors NMOS1, NMOS2. The second reference voltage is determined by the resistances of the sixth and seventh resistors R6, R7 and the threshold voltage of the third N-type metal oxide semiconductor field effect transistor NMOS3. The third reference voltage is determined by the resistances of the eighth and ninth resistors R8, R9 and the threshold voltage of the fourth N-type metal oxide semiconductor field effect transistor NMOS4.

In this embodiment, the ratio of the resistance of the second resistor R2 to that of the third resistor R3 is equal to the ratio of the resistance of the fourth resistor R4 to that of the fifth resistor R5. When the transistors NMOS3, NMOS 4 are turned off, the value of third voltage VD is equal to the value of the first voltage VB.

Figure 6:
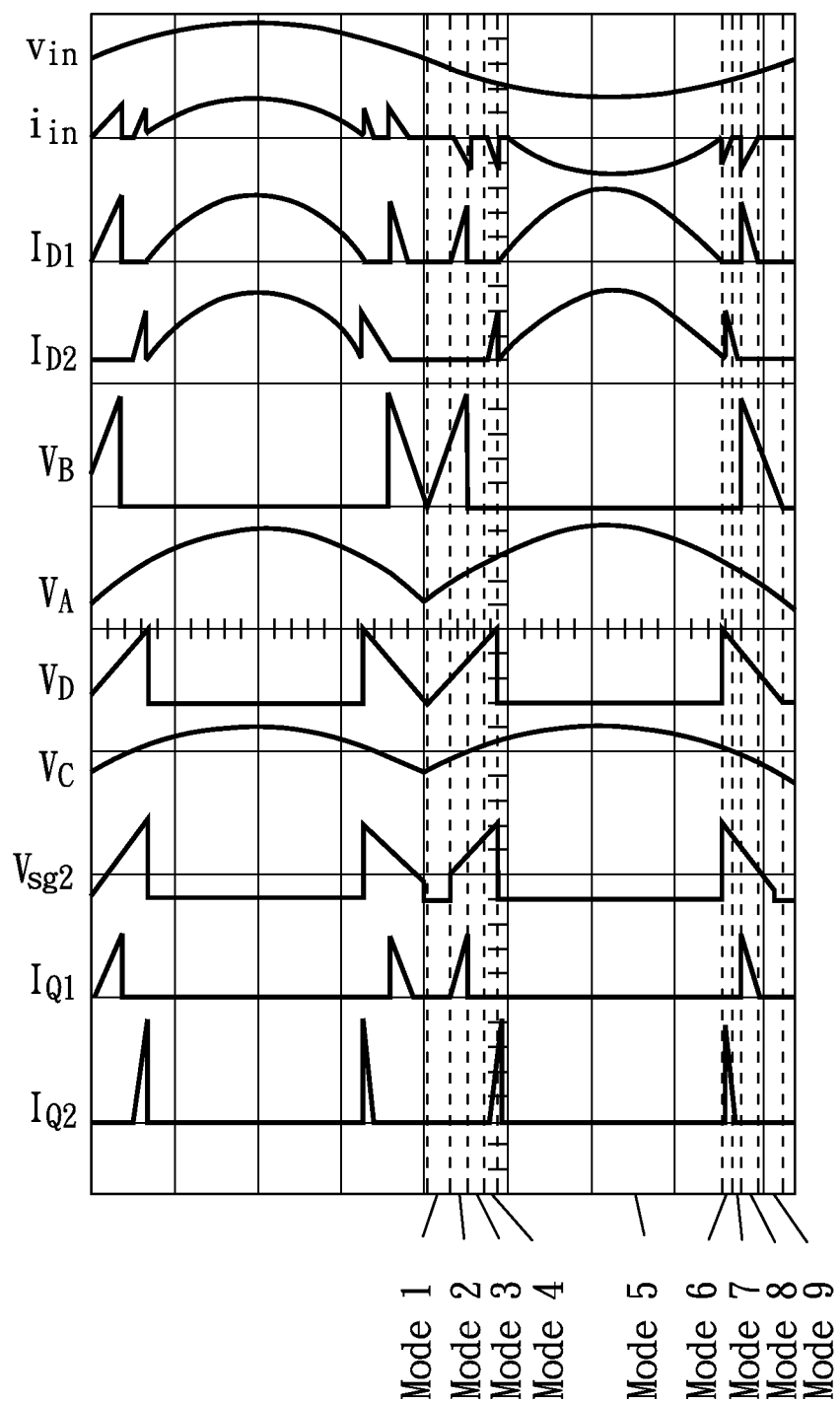
FIG. 6 is a timing diagram of the LED driving device in accordance with the second embodiment of the present invention.

As shown in FIG. 6, the first voltage VB, second voltage VA, third voltage VD and fourth voltage VC represent the control signals of the transistors NMOS1, PMOS, NMOS2, NMOS 4, respectively. Hereinafter, a description is given for nine operation modes when the AC voltage $v_{in}$ is in the negative half cycle.

When the AC voltage $v_{in}$ is zero, the transistors NMOS1-NMOS3, PMOS are all turned off, and thus there is no current flowing through the first and second LED modules D1, D2.

Mode 1:

When the rectified voltage is gradually increased from zero to be larger than the first reference voltage, the first and third voltages VB, VD are increased to exceed the threshold voltages of the two transistors NMOS1, NMOS2, and thus the two transistors NMOS1, NMOS2 are turned on. Because the transistor NMOS2 is turned on, the source-gate voltage Vsg2 of the transistor PMOS is increased so that the transistor PMOS is also turned on and, at this time, the first and second LED modules D1, D2 are deemed to be connected in parallel between the first and second output terminals o1, o2 of the rectifier circuit 1. At this moment, the rectified voltage does not reach the initial turn-on voltage of the first and second LED modules D1, D2, and thus there is no current flowing through. When the rectified voltage is gradually increased to turn on the first LED module D1, mode 2 is entered.

Mode 2:

The rectified voltage is gradually increased to turn on the first LED module D1. Different from the first embodiment, the rectified voltage at this time is not large enough to turn on the second LED module D2 (in this embodiment, the turn-on voltage of D2 is assumed to be twice of the turn-on voltage of D1 for illustrative purpose only). Therefore, with the increasing of the AC voltage $v_{in}$, the current $I_{D1}$ is also gradually increased. When the rectified voltage is increased to be larger than the second reference voltage, the second voltage VA is large enough to turn on the transistor NMOS3, and mode 3 is entered.

Mode 3:

The rectified voltage is increased to make the second voltage VA large enough to turn on the transistor NMOS3, and the first voltage VB is pulled to ground level, so that the transistor NMOS1 is cut off. At this moment, however, the fourth voltage VC is not large enough to turn on the transistor NMOS4 due to the relation of voltage-dividing ratio. Thus, the transistor NMOS2 is still in on state, and the current $I_{D1}$ is decreased to zero. When the rectified voltage is large enough to turn on the second LED module D2, mode 4 is entered.

Mode 4:

The rectified voltage is increased to be large enough to turn on the second LED module D2, the current $I_{D2}$ is increased. When the rectified voltage is increased to be larger than the third reference voltage, the fourth voltage VC is large enough to turn on the transistor NMOS 4 and mode 5 is entered.

Mode 5:

When the rectified voltage is increased and the fourth voltage VC is large enough to turn on the transistor NMOS4, the third voltage VD is pulled to the ground level, and the transistor NMOS2 and the transistor PMOS are both cut off. At this moment, the current $I_{D2}$ is decreased to zero. When the AC voltage $v_{in}$ is large enough to turn on and connect the two LED modules D1, D2 in series, mode 6 is entered.

Mode 6:

When the rectified voltage is increased to be large enough to turn on and connect the two LED modules D1, D2 in series, the currents $I_{D1}$, $I_{D2}$ are gradually increased as the rectified voltage is increased. When the rectified voltage is gradually decreased, the currents $I_{D1}$, $I_{D2}$ are slowly decreased to zero. When the rectified voltage is decreased to be smaller than the third reference voltage and the fourth voltage VC is too low to turn on the transistor NMOS4, mode 7 is entered.

Mode 7:

The transistor NMOS4 is cut off so that the transistor NMOS2 is turned on and the transistor PMOS is also turned on. At this moment, the rectified voltage is directly across on the second LED module D2, and thus the current $I_{D2}$ is increased abruptly and then is decreased as the rectified voltage is decreased. When the rectified voltage is decreased to be smaller than the second reference voltage so that the second voltage VA is smaller than threshold voltage of the transistor NMOS3, mode 8 is entered.

Mode 8:

The rectified voltage is decreased to make the second voltage VA lower than the threshold voltage of the transistor NMOS3, and thus the transistor NMOS3 is cut off and the transistor NMOS1 is turned on. At this moment, the rectified voltage is directly across on the first LED module D1, and thus the current $I_{D2}$ is increased abruptly and then is gradually decreased to zero as the rectified voltage is decreased. When the rectified voltage is decreased to be smaller than the first reference voltage so that the first and third voltages VB, VD are all smaller than threshold voltages of the two transistors NMOS1, NMOS2, mode 9 is entered.

Mode 9:

The rectified voltage is decreased to make both the first and third voltages VB, VD smaller than the threshold voltages of the two transistors NMOS1, NMOS2, and thus the two transistors NMOS1, NMOS2 and the transistor PMOS are cut off. The rectified voltage is not large enough to turn on the first and second LED modules D1, D2. When the rectified voltage is decreased to zero, the operation of the negative half cycle comes to an end.

When the AC voltage $v_{in}$ is in the positive half cycle, the operation of the circuit is similar and thus a detailed description is deemed unnecessary.

Figure 7:
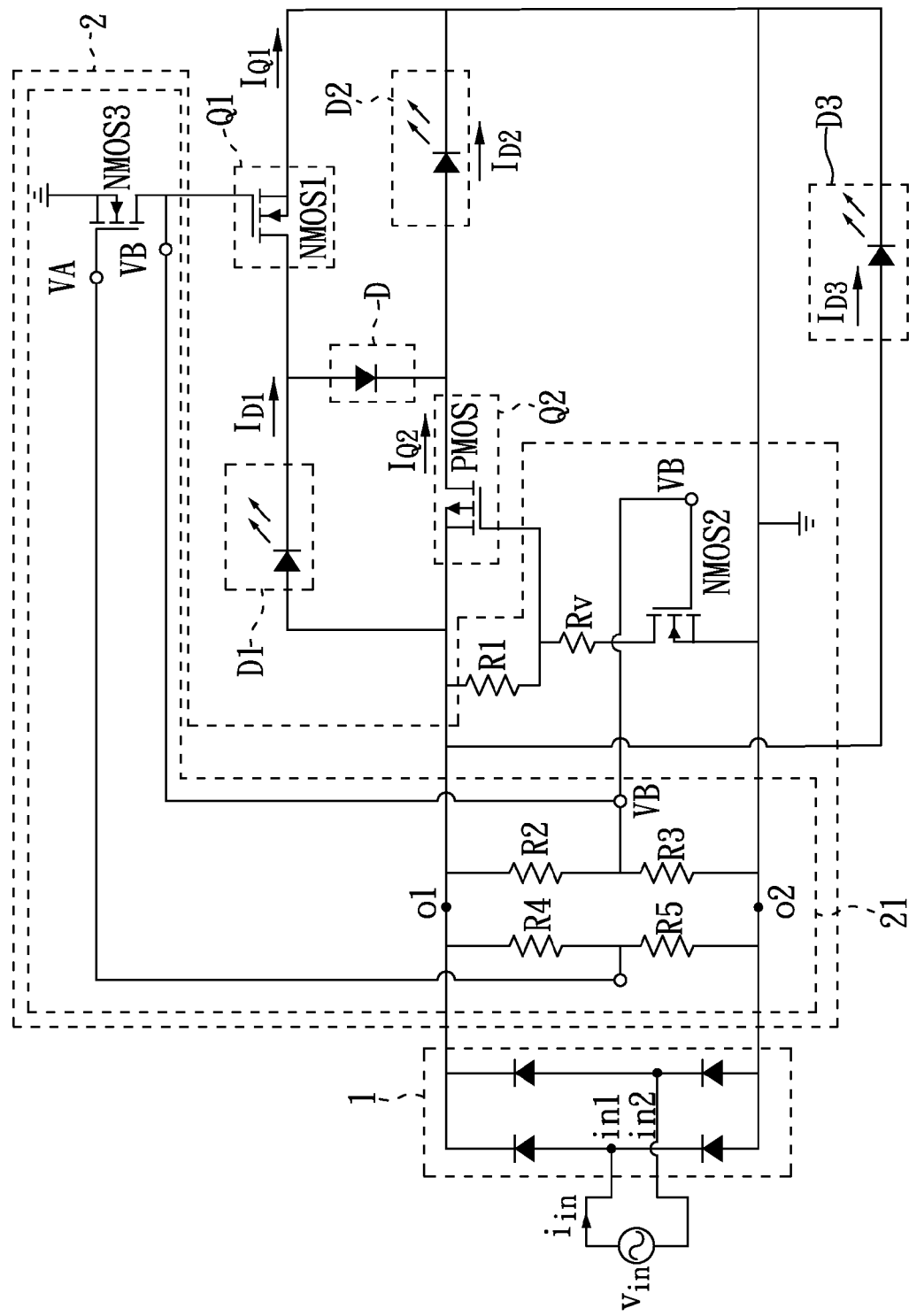
FIG. 7 is a circuit diagram of the LED driving device in accordance with a third embodiment of the present invention.

With reference to FIG. 7, there is shown an LED driving device in accordance with a third embodiment of the present invention, which is similar to that of the first embodiment except for further including: a third LED module D3.

The third LED module D3 has a first terminal electrically connected to the first output terminal o1 of the rectifier circuit 1 and a second terminal electrically connected to the second output terminal o2 of the rectifier circuit 1, and is able to establish a current path from the first terminal to the second terminal.

Figure 8:
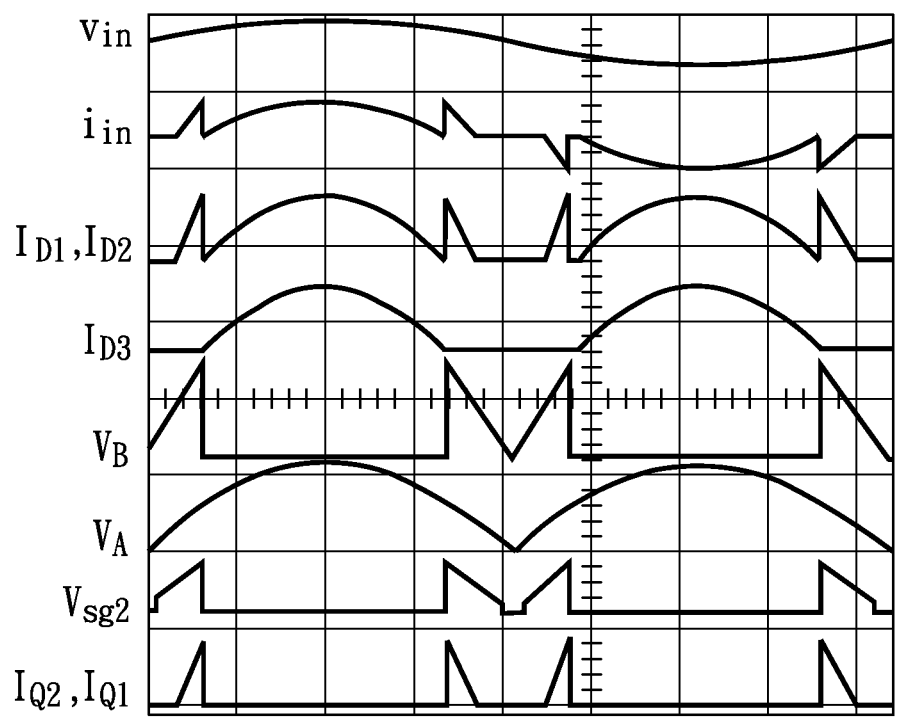
FIG. 8 is a timing diagram of the LED driving device in accordance with the third embodiment of the present invention.

As shown in FIG. 8, the parameter $I_{D3}$ represents current flowing through the third LED module D3. Furthermore, in this embodiment, the voltage of the third LED module D3 for starting to establish a current path is substantially the same as that of the first and second LED modules D1, D2 connected in series for establishing a current path, but is not limited to this. Alternatively, the voltage of the third LED module D3 for starting to establish a current path can be changed according to the actual requirement.

In view of the foregoing, it is known that the preferred embodiments of the present invention can be applied to drive an LED with the following advantages:

(1) The architecture is simple and the design is easy, in comparison with the voltage detecting circuit 20 of the prior LED driving device, so as to reduce the design cost; and (2) The LED can be turned on when the AC voltage $v_{in}$ is relatively low, thereby greatly increasing the efficiency.

Although the present invention has been explained in relation to its preferred embodiment, it is to be understood that many other possible modifications and variations can be made without departing from the spirit and scope of the invention as hereinafter claimed.

What is claimed is:

1. An LED driving device comprising:
   a rectifier circuit including a pair of input terminals and first and second output terminals, for receiving an AC voltage from the pair of input terminals and rectifying the AC voltage so as to output a pulsed rectified voltage at the first and second output terminals.
   a first LED module and a first switch connected in series, which are electrically connected between the first and second output terminals of the rectifier circuit, wherein the first switch is controllable to switch between on and off states;
   a second LED module and a second switch connected in series, which are electrically connected between the first and second output terminals of the rectifier circuit, wherein the second switch is controllable to switch between on and off states; and
   a diode module connected between a common node of the first LED module and the first switch and a common node of the second LED module and the second switch.

2. The LED driving device as claimed in claim 1, further comprising a control circuit electrically connected between the first and second output terminals of the rectifier circuit and the two switches for controlling whether to turn on the first and second switches or not according to the rectified voltage.

3. The LED driving device as claimed in claim 1, wherein the first LED module has a first terminal electrically connected to the first output terminal of the rectifier circuit, and a second terminal, and is able to establish a current path from the first terminal to the second terminal, and wherein the first switch includes a first N-type metal oxide semiconductor field effect transistor, which has a drain electrically connected to the second terminal of the first LED module, a source electrically connected to the second output terminal of the rectifier circuit, and a gate electrically connected to the control circuit.

4. The LED driving device as claimed in claim 3, wherein the second LED module has a first terminal and a second terminal electrically connected to the second output terminal of the rectifier circuit, and is able to establish a current path from the first terminal to the second terminal, and wherein the second switch includes a P-type metal oxide semiconductor field effect transistor, which has a drain electrically connected to the first terminal of the second LED module, a source electrically connected to the first output terminal of the rectifier circuit, and a gate electrically connected to the control circuit.

5. The LED driving device as claimed in claim 4, wherein the diode module has a first terminal electrically connected to a common node of the first LED module and the first switch, and a second terminal electrically connected to a common node of the second LED module and the second switch, and is able to establish a current path from the first terminal to the second terminal.

6. The LED driving device as claimed in claim 5, wherein the control circuit includes:
   a first resistor and a second N-type metal oxide semiconductor field effect transistor connected in series, which are connected between the first and second output terminals of the rectifier circuit and have a common node connected to the gate of the P-type metal oxide semiconductor field effect transistor, the first resistor being electrically connected to the first output terminal of the rectifier circuit, the second N-type metal oxide semiconductor field effect transistor being connected to the second output terminal of the rectifier circuit and having a gate; and
   a control unit electrically connected between the first and second output terminals of the rectifier circuit and the gates of the first and second N-type metal oxide semiconductor field effect transistors for controlling whether to turn on the first and second N-type metal oxide semiconductor field effect transistors or not according to the rectified voltage,
   wherein, when the second N-type metal oxide semiconductor field effect transistor is turned on, voltage across on the first resistor is large enough to turn on the P-type metal oxide semiconductor field effect transistor, and when the second N-type metal oxide semiconductor field effect transistor is turned off, voltage across on the first resistor is not large enough to turn on the P-type metal oxide semiconductor field effect transistor.

7. The LED driving device as claimed in claim 6, wherein, when the rectified voltage is between a first reference voltage and a second reference voltage, the control unit turns on the first and second N-type metal oxide semiconductor field effect transistors; otherwise, the control unit turns off the first and second N-type metal oxide semiconductor field effect transistors.

8. The LED driving device as claimed in claim 7, wherein the control unit includes:
   a second resistor and a third resistor connected in series, which are electrically connected between the first and second output terminals of the rectifier circuit, and have a common node electrically connected to the gates of the first and second N-type metal oxide semiconductor field effect transistors;
   a fourth resistor and a fifth resistor connected in series, which are electrically connected between the first and second output terminals of the rectifier circuit; and
   a third N-type metal oxide semiconductor field effect transistor having a drain electrically connected to the common node of the second and third resistors, a source electrically connected to ground, and a gate electrically connected to a common node of the fourth and fifth resistors,
   wherein the first reference voltage is smaller than the second reference voltage, the first reference voltage is determined by resistances of the second and third resistors and threshold voltages of the first and second N-type metal oxide semiconductor field effect transistors, and the second reference voltage is determined by resistances of the fourth and fifth resistors and threshold voltage of the third N-type metal oxide semiconductor field effect transistor.

9. The LED driving device as claimed in claim 8, wherein voltage of the first LED module for starting to establish a current path is the same as that of the second LED module for starting to establish a current path.

10. The LED driving device as claimed in claim 6, wherein, when the rectified voltage is between a first reference voltage and a second reference voltage, the control unit turns on the first and second N-type metal oxide semiconductor field effect transistors, and when the rectified voltage is between the second reference voltage and a third reference voltage, the first N-type metal oxide semiconductor field effect transistor is turned off and the second N-type metal oxide semiconductor field effect transistor is turned on; otherwise, the first and second N-type metal oxide semiconductor field effect transistors are turned off, where the first reference voltage is smaller than the second reference voltage, and the second reference voltage is smaller than the third reference voltage.

11. The LED driving device as claimed in claim 10, wherein the control unit includes:
- a second resistor and a third resistor connected in series, which are electrically connected between the first and second output terminals of the rectifier circuit, and have a common node electrically connected to the gate of the first N-type metal oxide semiconductor field effect transistor;
- a fourth resistor and a fifth resistor connected in series, which are electrically connected between the first and second output terminals of the rectifier circuit, and have a common node electrically connected to the gate of the second N-type metal oxide semiconductor field effect transistor;
- a sixth resistor and a seventh resistor connected in series, which are electrically connected between the first and second output terminals of the rectifier circuit;
- an eighth resistor and a ninth resistor connected in series, which are electrically connected between the first and second output terminals of the rectifier circuit;
- a third N-type metal oxide semiconductor field effect transistor NMOS3 having a drain electrically connected to a common node of the second and third resistors, a source electrically connected to ground, and a gate electrically connected to the sixth and seventh resistors; and
- a fourth N-type metal oxide semiconductor field effect transistor having a drain electrically connected to a common node of the fourth and fifth resistors, a source electrically connected to ground, and a gate electrically connected to the eighth and ninth resistors 9, wherein the first reference voltage is determined by resistances of the second, third, fourth and fifth resistors and threshold voltages of the first and second N-type metal oxide semiconductor field effect transistors; the second reference voltage is determined by resistances of the sixth and seventh resistors and threshold voltage of the third N-type metal oxide semiconductor field effect transistor; the third reference voltage is determined by resistances of the eighth and ninth resistors and threshold voltage of the fourth N-type metal oxide semiconductor field effect transistor.

12. The LED driving device as claimed in claim 11, wherein voltage of the first LED module for starting to establish a current path is smaller than that of the second LED module for starting to establish a current path.

13. The LED driving device as claimed in claim 1, further comprising
- a third LED module having a first terminal electrically connected to the first output terminal of the rectifier circuit and a second terminal electrically connected to the second output terminal of the rectifier circuit, and being able to establish a current path from the first terminal to the second terminal.

* * * * *